United States Patent [19]
Colborn et al.

[11] Patent Number: 5,952,117
[45] Date of Patent: Sep. 14, 1999

[54] METHOD AND APPARATUS FOR REFUELING AN ELECTROCHEMICAL POWER SOURCE

[75] Inventors: Jeffrey A. Colborn, Cardiff; Kenneth A. Wright, La Mesa; Ronald Gulino, Solano Beach, all of Calif.

[73] Assignee: Metallic Power, Inc., Chula Vista, Calif.

[21] Appl. No.: 08/861,513

[22] Filed: May 22, 1997

Related U.S. Application Data

[63] Continuation of application No. 08/736,395, Oct. 24, 1996, abandoned.

[51] Int. Cl.$^6$ ............................................. H01M 608/04
[52] U.S. Cl. .................................. 429/27; 429/49; 429/51; 429/72; 429/101
[58] Field of Search .................................... 429/27, 49

[56] References Cited

U.S. PATENT DOCUMENTS

| | | | |
|---|---|---|---|
| 3,847,671 | 11/1974 | Leparulo et al. | 136/86 A |
| 3,879,225 | 4/1975 | Backhurst et al. | 136/86 |
| 4,105,829 | 8/1978 | Venero | 429/101 X |
| 4,127,701 | 11/1978 | Symons et al. | 429/19 |
| 4,147,839 | 4/1979 | Solomon et al. | 429/15 |
| 4,198,475 | 4/1980 | Zaromb | 429/15 |
| 4,352,864 | 10/1982 | Struthers | 429/101 X |
| 4,485,154 | 11/1984 | Remick et al. | 429/51 X |
| 4,828,939 | 5/1989 | Turley et al. | 429/38 |
| 4,842,963 | 6/1989 | Ross, Jr. | 429/21 |
| 4,950,561 | 8/1990 | Niksa et al. | 429/27 |
| 5,006,424 | 4/1991 | Evans et al. | 429/15 |
| 5,156,925 | 10/1992 | Lapp | 429/19 |
| 5,196,275 | 3/1993 | Goldman et al. | 429/27 |
| 5,208,526 | 5/1993 | Goldman et al. | 320/2 |
| 5,260,144 | 11/1993 | O'Callaghan | 429/27 X |
| 5,405,713 | 4/1995 | Pecherer et al. | 429/49 |
| 5,411,815 | 5/1995 | Goldstein | 429/50 |
| 5,434,020 | 7/1995 | Cooper | 429/210 |
| 5,558,947 | 9/1996 | Robison | 429/49 X |

FOREIGN PATENT DOCUMENTS

| | | |
|---|---|---|
| 2639767 | 6/1990 | France . |
| 2669775 | 5/1992 | France . |

OTHER PUBLICATIONS

John F. Cooper, Powering Future Vehicles With the Refuelable Zinc/Air Battery, Science & Technology Review, Oct. 1995, pp. 6–13.

John F. Cooper, A Refuelable Zinc/Air Battery for Fleet Electric Vehicle Propulsion, SAE Technical Paper 951948, (1995) pp. 137–143.

P.C. Foller, Improved slurry zinc/air systems as batteries for urban vehicle propulsion, Journal of Applied Electrochemistry, vol. 16, (1986) pp. 527–543.

J.W. Evans, G. Savaskan, A zinc–air cell employing a packed bed anode, Journal of Applied Electrochemistry, vol. 21, (1991) pp. 105–110.

T. Huh, G. Savaskan, J.W. Evans, Further studies of a zinc–air cell employing a packed bed anode, Journal of Applied Electrochemistry, vol. 22, (1992) pp. 916–921.

(List continued on next page.)

*Primary Examiner*—Maria Nuzzolillo
*Assistant Examiner*—Mark Ruthkosky
*Attorney, Agent, or Firm*—Lyon & Lyon LLP

[57] ABSTRACT

A transportable container for refueling a refuelable battery includes a case, an electrolyte reservoir within the case, a first valve connected to the electrolyte reservoir, a fuel compartment within the case, a second valve connected to the fuel compartment, and a conduit connected to the electrolyte reservoir and the fuel compartment. When the transportable container is attached to a refuelable battery, a closed flow circuit for the circulation of electrolyte is defined. Fuel particles and electrolyte are fed from the transportable container into the refuelable battery. When the refuelable battery is discharged, the transportable container, containing spent electrolyte and reaction products, is detached from the refuelable battery.

37 Claims, 7 Drawing Sheets

OTHER PUBLICATIONS

J.C. Salas–Morales, J.W. Evans, Futher studies of a zinc–air cell employing a packed bed anode, Journal of Applied Electrochemistry, vol. 24 (1994) pp. 858–862.

G. Bronoel, A. Millot, R. Rouget, N. Tassin, Aluminium–Air Battery With Automatic Fedding of Aluminium, Research and Development in Non–Mechanical Electrical Power Sources. The 17th International Power Sources Symposium, (1991) pp. 245–252.

METHOD AND APPARATUS FOR REFUELING AN ELECTROCHEMICAL POWER SOURCE

This is a continuation of co-pending application(s) Ser. No. 08/736,395 filed on Oct. 24, 1996 now abandoned.

BACKGROUND OF THE INVENTION

The field of the invention is power sources employing electrochemical cells.

Electrochemical power sources are known to employ electrochemical cells that utilize particulate electrodes. A particulate electrode generally is comprised of a bed of electrochemically active particles, or particles onto which electrochemically active material can be electrodeposited. The particulate electrode may be used in a cathodic process such as the electrodeposition of metals onto the particles, or it may be used in an anodic process such as the dissolution of metal to produce electrical energy.

Electrochemical power sources using the anodic process include, but are not limited to, metal/air batteries such as zinc/air and aluminum/air batteries. Such metal/air batteries employing an anode comprised of metal particles fed into the cell and dissolved during discharge are often called refuelable batteries. Zinc/air refuelable battery cells are comprised of an anode, a cathode, and an electrolyte. The anode is generally formed of zinc particles immersed in electrolyte and can be held in place by a mesh or honeycomb of inert conductor. The cathode is generally comprised of a semipermeable membrane, a mesh of inert conductor, and a catalyzed layer for reducing oxygen that diffuses through the membrane from outside the cell. The cathode and anode are generally separated by an electronic insulator that is permeable to the electrolyte. A zinc/air refuelable battery consumes zinc particles and oxygen to produce electricity and reaction products. The reaction products are generally comprised of dissolved zincate and particles of zinc oxide suspended in the spent electrolyte.

Metal/air refuelable batteries can be refueled in minutes or seconds, compared to the several hours typically required for recharging conventional batteries. This makes refuelable batteries very suitable for use in mobile applications such as electric vehicles, lawnmowers, portable power sources, and many other applications where rapid refuelability is desirable.

During the refueling operation, fresh electrochemically active particles, such as aluminum or zinc pellets, and electrolyte are added to the refuelable battery, and spent electrolyte containing reaction products is removed. Typically, the spent electrolyte containing the reaction products can then be regenerated.

The reaction products from aluminum/air refuelable batteries must be either transported to a major industrial facility (such as an alumina plant) for recycling or used, as is, for another purpose (such as water treatment). The spent electrolyte containing reaction products from zinc/air refuelable batteries can be completely regenerated at a much smaller facility at higher efficiency. For this reason, and also due to its lower parasitic corrosion rate, zinc may be preferable over aluminum as the anodic fuel in metal/air refuelable batteries for potential commercial applications. However, the higher energy density of aluminum may make it more suitable for some applications, especially if further advances are made in reducing its parasitic corrosion rate.

Several methods for refueling metal/air refuelable batteries have been proposed by others. One such method includes a refueling system for a zinc/air refuelable battery in which hoppers above each cell are hydraulically filled from a zinc-forming apparatus by a high-velocity jet of electrolyte passing across the top of each hopper. This and other hydraulically refueled systems have the drawback that they require a large recirculation of electrolyte to achieve complete refueling, as well as close proximity to an apparatus for storing or forming the zinc fuel. This makes them unsuitable for many applications, such as lawnmowers and portable power sources, which are impractical to return to a service site for each refueling.

Another method involves a honeycomb sheet of inert conductor that is filled with a slurry of fine zinc particles, electrolyte, and additives to form a planar anode cassette. The battery is refueled by replacing these cassettes (one cassette per cell). Such a system has the rather severe disadvantage of requiring the replacement of a large number of cassettes (for example, 528 in an electric van). Even for a small application such as an electric lawnmower, such a system would require the replacement of perhaps 24 or more individual cassettes during each refueling operation. Additional drawbacks to such a system include less than 100% utilization of the zinc and potential exposure of the user to the caustic electrolyte, which is typically potassium hydroxide.

Other refuelable battery designs employ a storage hopper above each cell for containing a reserve of metal particles, but do not adequately address the problem of how the particles and fresh electrolyte can be conveniently, reliably, rapidly, and accurately fed into the multiple storage hoppers without exposing the user to the caustic electrolyte. These and other designs also do not adequately address the problem of safely, rapidly, and conveniently removing the spent electrolyte and reaction products from the battery cells.

Thus, it is apparent that a more convenient, safe, and rapid refueling method and apparatus is needed for metal/air refuelable batteries. This is especially the situation if metal/air refuelable batteries are to be practical for powering small devices such as electric lawnmowers and portable equipment. In particular, it would be advantageous if a refuelable battery system included transportable containers capable of feeding more than one electrochemical cell. It would be further advantageous if the refuelable battery system did not allow exposure of the user to the caustic electrolyte at any time, especially during the refueling operation and during the replacement and refilling of the transportable containers. Finally, it would be advantageous if the transportable containers could be conveniently, safely, and rapidly refilled at an apparatus for storing or forming the metal fuel.

SUMMARY OF THE INVENTION

The present invention is a method and apparatus for refueling and operating a refuelable battery.

In a first, separate aspect of the present invention, a transportable container, capable of connecting to and refueling a refuelable battery, comprises an electrolyte reservoir, at least one fuel compartment, at least one conduit in fluid connection with at least one fuel compartment and with the electrolyte reservoir, and a plurality of valves in fluid connection with the electrolyte reservoir and at least one fuel compartment, the valves being connectable to a refuelable battery, so that, once connected, the transportable container and the refuelable battery define an electrolyte flow circuit through the refuelable battery and the transportable container during operation of the refuelable battery.

In a second, separate aspect of the present invention, a transportable container, capable of connecting to a refuelable battery, comprises at least one fuel compartment and a plurality of valves in fluid connection with at least one fuel compartment and capable of being connected to a refuelable battery, so that, once connected, the transportable container and the refuelable battery define an electrolyte flow circuit through the refuelable battery and the transportable container during operation of the refuelable battery.

In a third, separate aspect of the present invention, a refuelable electrochemical power source comprises a refuelable battery and a transportable container removably attached to the refuelable battery, where the refuelable battery and the transportable container define an electrolyte flow circuit through the refuelable battery and the transportable container during operation of the refuelable battery.

In a fourth, separate aspect of the present invention, a method of operating a refuelable electrochemical power source comprises attaching the transportable container to a refuelable battery to define an electrolyte flow circuit through the refuelable battery and the transportable container, dispensing the fuel particles and electrolyte solution from the transportable container into the refuelable battery, circulating electrolyte through the battery and the attached transportable container for a period of time to discharge the refuelable battery and thereby dissolve some of the fuel particles into reaction products in spent electrolyte, detaching the transportable container containing the reaction products and spent electrolyte from the refuelable battery, and attaching a transportable container containing fresh fuel particles and electrolyte to the refuelable battery.

BRIEF DESCRIPTION OF THE DRAWINGS

In the drawings, wherein similar reference characters denote similar elements throughout the several views.

DETAILED DESCRIPTION

A system is disclosed which is capable of feeding electrochemically active fuel particles, such as zinc pellets, and electrolyte, such as potassium hydroxide, from transportable containers into refuelable batteries employing multiple battery cells having particulate electrodes which utilize an anodic process. The circulation of spent electrolyte and reaction products from discharged battery cells back into transportable containers is also provided, as is the feeding of electrochemically active fuel particles and electrolyte into transportable containers from an apparatus for storing or forming the electrochemically active fuel particles. Spent electrolyte and reaction products of discharged battery cells from transportable containers may be fed into an apparatus for storing or regenerating the reaction products.

One or more transportable containers are capable of being attached to, or inserted into, an electrochemical device, such as a metal/air refuelable battery. Electrochemically active fuel particles in the transportable container can be automatically gravity fed from each of the transportable containers into one or more electrochemical cells in the device. In addition, electrolyte can be fed to or from the one or more transportable containers, together with any electrochemically active fuel particles or reaction products that may be entrained in, or propelled along with, the electrolyte.

The transportable containers may be of any shape and are preferably made of a material inert to the electrochemically active fuel particles and electrolyte. The transportable containers are preferably simple and inexpensive to manufacture and able to withstand considerable abuse without leaking. They preferably are of a shape and size to enable efficient storage and easy handling and do not significantly reduce the physical stability of an electrochemical device when one or more transportable containers are attached to it.

A number of variations are possible on the physical interface between an electrochemical device such as a refuelable battery and a transportable container. Advantageous characteristics of this interface include promotion of reliable feeding of fuel particles from the transportable container into the refuelable battery cells, promotion of reliable feeding of fresh electrolyte from the transportable container into the battery cells, promotion of reliable feeding of spent electrolyte from the battery cells into the transportable container, minimization of exposure of the user to electrolyte at all times, especially during replacement of the transportable container, promotion of easy and rapid transportable container replacement, minimization of parasitic electrical conduction between battery cells, efficient utilization of space, simplicity, durability, and low manufacturing cost.

A number of variations are also possible on the physical interface between the transportable containers and a refilling apparatus for transportable containers. Advantageous characteristics of this interface include promotion of reliable feeding of spent electrolyte from the transportable containers into the refilling apparatus, promotion of reliable feeding of fuel particles from the refilling apparatus into the transportable containers, promotion of reliable feeding of fresh electrolyte from the refilling apparatus into the transportable containers, minimization of exposure of the user to electrolyte at all times, especially during refilling of the transportable containers, promotion of easy and rapid refilling of transportable containers, efficient utilization of space, simplicity, durability, and low manufacturing cost.

Figure 1:
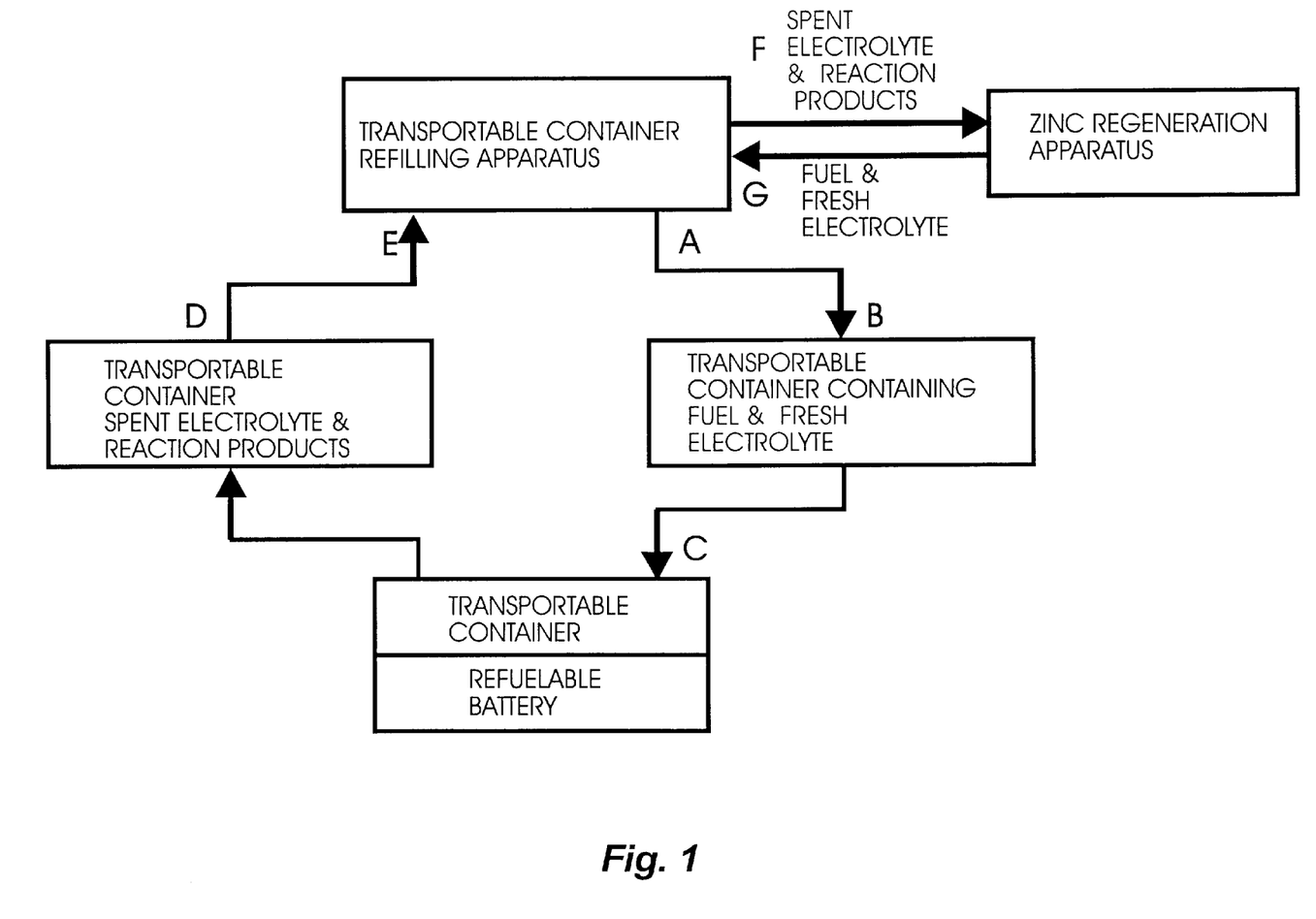
FIG. 1 is a diagram showing the flow of fuel and electrolyte through a discharge and regeneration cycle.

A flowchart diagram showing the flow of fuel particles and electrolyte through the discharge and regeneration cycle of a zinc/air refuelable battery is shown in FIG. 1. This diagram shows a closed-loop system employing the following steps: (A) zinc fuel particles and fresh electrolyte are placed into a transportable container using a transportable container refilling apparatus; (B) the transportable container is then transported to a refuelable battery; (C) the transportable container is then attached to, or inserted into, the refuelable battery, becoming part of the electrolyte flow circuit of the refuelable battery, and the transportable container's contents, zinc fuel particles and electrolyte, are used to discharge the refuelable battery for a period of time; (D) the transportable container, containing at least partially spent electrolyte and reaction products, is removed from the refuelable battery and transported back to the refilling apparatus; and (E) the contents of the transportable container are emptied into the refilling apparatus and step (A) is repeated. In addition, (F) the spent electrolyte and reaction products are transferred from the refilling apparatus to a zinc regeneration apparatus, where the spent electrolyte and reaction products are regenerated back into zinc fuel particles and fresh electrolyte, which are then (G) returned to the refilling apparatus. The refilling apparatus and zinc regeneration apparatus may be separate and distinct or may be integral parts of a single overall apparatus. If a metal other than zinc is used, such as aluminum, the metal regeneration apparatus may be a large industrial facility far removed from the refilling apparatus, or the metal may not be regenerated.

Figure 2:
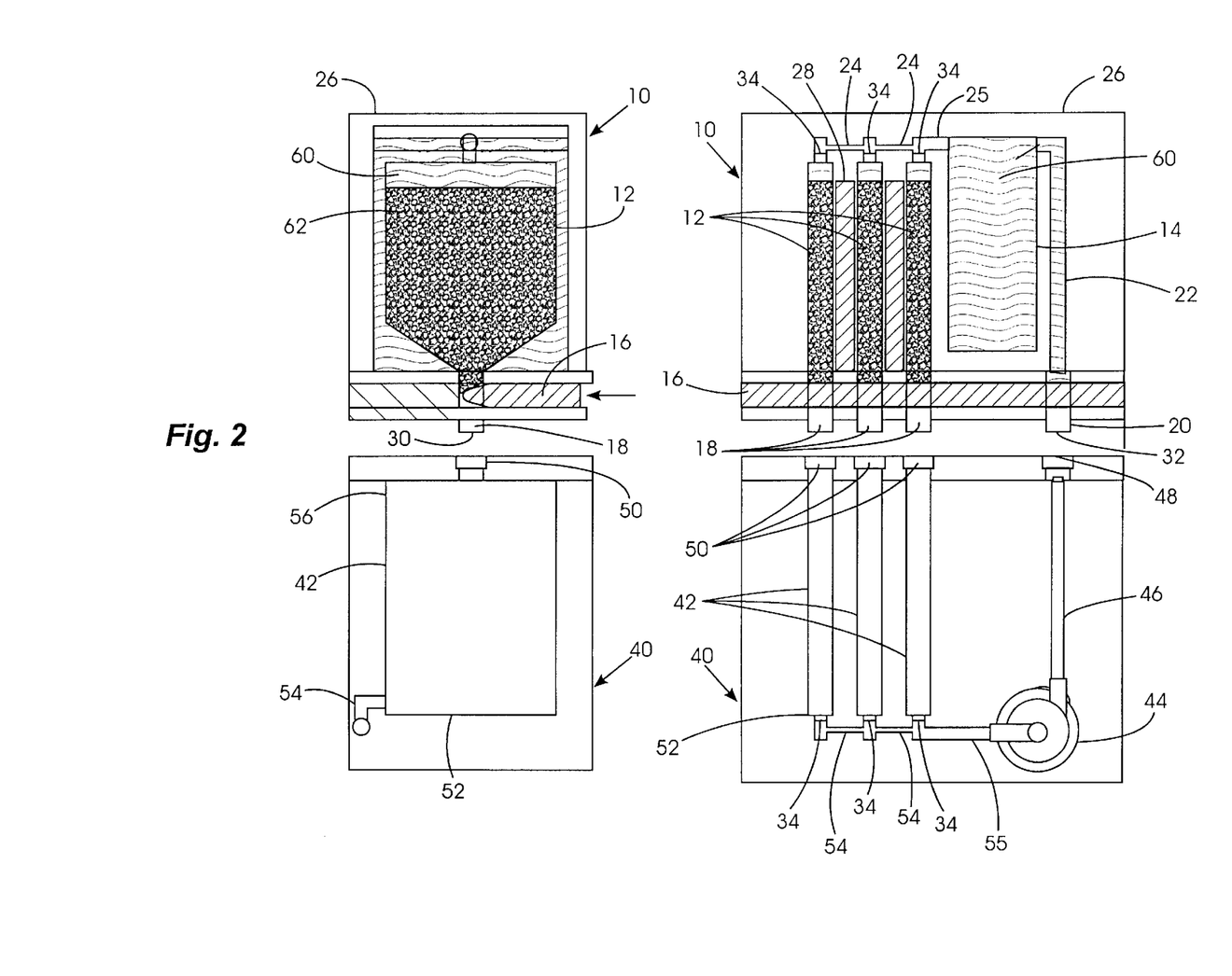
FIG. 2 is a schematic illustration of a first embodiment of a transportable container and a refuelable battery prior to attachment.
Figure 3:
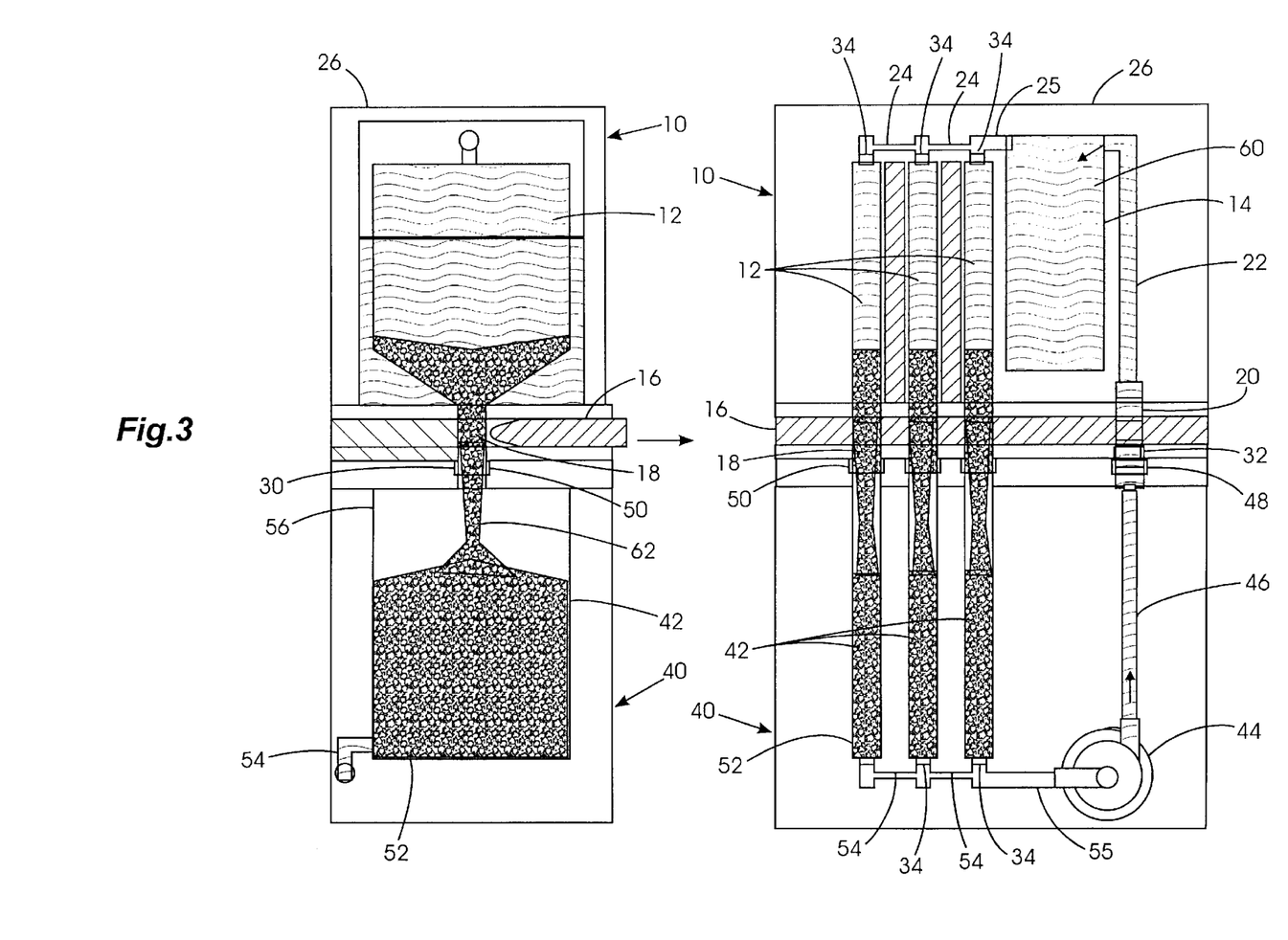
FIG. 3 is a schematic illustration of the first embodiment of the transportable container and the refuelable battery of FIG. 2, attached together.

A first embodiment of a transportable container 10 and its mode of sealing and attachment to a refuelable battery 40 is shown in FIGS. 2 and 3. Referring to the figures, the transportable container 10 is shown, for illustration purposes, as designed for feeding a three cell refuelable battery 40 utilizing fuel particles 62 in an anodic process. The transportable container 10 and the refuelable battery 40 together define a closed flow circuit for the circulation of electrolyte 60 through the transportable container 10 and the refuelable battery 40 during battery operation.

The transportable container 10 is comprised of a case 26, which may be liquid sealed, and within which are a set of fuel compartments 12, which are, preferably, electrically isolated from each other. The fuel compartments can be isolated by separating them with divider panels 28, which can be made from any material capable of electrically isolating the fuel compartments 12 from each other. Plastic materials, such as PVC or acetal are typical for the transportable container 10. The fuel compartments 12 are connected to each other via narrow and relatively long conduits 24. The fuel compartments 12 are also connected to an electrolyte reservoir 14 via a wider conduit 25.

A filter 34 is placed in each of the conduits 24, or in the fuel compartments 12 adjacent to the conduits 24, to prevent the passage of fuel particles 62 through the conduits 24 between the fuel compartments 12. If fuel particles 62 enter the conduits 24, a blockage of the conduits 24 or an electrical short circuit can result.

The fuel compartments 12 are capable of holding a volume of the fuel particles 62, such as zinc pellets, which are immersed in an electrolyte solution 60, which is, typically, potassium hydroxide. The electrolyte reservoir 14 is similarly capable of holding a volume of additional electrolyte. A wide variety of relative sizes, shapes, and positions of the fuel compartments 12 and the electrolyte reservoir 14 are possible.

The fuel compartments 12 can be made large enough to accommodate the volume of the electrolyte solution 60 that would otherwise be held in the electrolyte reservoir 14. Moreover, although the fuel compartments 12 are shown schematically in a parallel arrangement for the flow of the electrolyte solution 60, a series arrangement could also be used, or a combination of both.

Alternatively, the transportable container 10 may have an electrolyte reservoir 14 without the fuel compartments 12, thus providing the refuelable battery 40 with electrolyte 60 for circulation during battery operation. In this case, fuel particles 62 would be fed into the refuelable battery 40 separately from the electrolyte 60.

Connected to the fuel compartments 12 are channels 18 which pass through the case 26 such that an end 30 of each channel 18 extends beyond the case 26. The ends 30 of the channels 18 are flexible. Connected to the electrolyte reservoir 14, via a tube 22, is a channel 20 which also passes through the case 26 such that an end 32 of the channel 20 extends beyond the case 26. The end 32 of the channel 20 is also flexible.

The transportable container 10 further comprises a sealing member 16 movably attached to the transportable container 10, and positioned so as to be capable of moving between a closed position and an open position to seal and unseal the channels 18 and 20. Thus, it can be seen that channels 18 and 20 act as valves for the fuel compartments 12 and the electrolyte reservoir 14. It is possible, however, that other valve arrangements could be used.

The sealing member 16 is positioned so as to prevent the flow of the electrolyte 60 or the fuel particles 62 through the channels 18 and 20 by, for example, pinching closed the flexible ends 30 and 32 channels 18 and 20. The sealing member 16 has a means (not shown) for conveniently moving it between the open and closed positions shown in FIGS. 2 and 3. Any convenient means may be used for this purpose, such as a lever and cam.

When the transportable. container 10 is not attached to the refuelable battery 40, the sealing member 16 is moved into the closed position shown in FIG. 2, and the flexible ends 30 and 32 of channels 18 and 20 are closed. During storage and transport, the transportable container 10 may be stored upside down from the orientation shown in FIG. 2 to minimize the possibility of slow leaks from the channels 18 and 20.

Additionally, a cover 36 (not shown) may be advantageously used to provide an additional seal for the channels 18 and 20 during storage and transport of the transportable container 10. The cover 36 could engage a raised lip 38 (not shown) or similar structure positioned on the case 26 around the channels 18 and 20. Other variations are possible. The cover 36 could be a separate component or could be attached, with a living hinge, for example, to the case 26 of the transportable container 10.

The refuelable battery 40, is configured to receive the transportable container 10. Referring to the FIGS. 2 and 3, the refuelable battery 40 is shown, for illustration purposes, as comprising three particulate electrode battery cells 42, each of which has a top end 56 and a bottom end 52. The battery cells 42 are connected to each other via narrow and relatively long conduits 54 attached to the bottom end 52 of each battery cell 42. The battery cells 42 are also connected to a pump 44, which is inside the refuelable battery 40, via a wider conduit 55.

Although the battery cells 42 are shown schematically in a parallel arrangement for the flow of the electrolyte 60, a series arrangement could also be used, or a combination of both. In a series arrangement, the pressure required to pump the electrolyte 60 through the refuelable battery 40 and the transportable container 10 would increase, while the ability of the electrolyte 60 to dissipate heat from the battery cells 42 would diminish.

A filter 34 is placed in each of the conduits 54, or in the bottom end 52 of each battery cell 42 adjacent to the conduits 54, to prevent the passage of fuel particles 62 through the conduits 54 between the battery cells 42. If fuel particles 62 enter the conduits 54, a blockage of the conduits 54 or an electrical short circuit can result.

The filter 34, can be made from any material capable of withstanding the electrolyte 60, such as rolled up polypropylene screen, and which allows the liquid electrolyte 60 to pass through, but prevents passage of the fuel particles 62.

It is possible that the conduits 54 and 24 may be made sufficiently narrow to prevent the passage of fuel particles 62 even without the filter 34, while still permitting the passage of electrolyte 60 and spent fuel. The fuel particles 62, such as zinc pellets, will vary in size during operation of the refuelable battery 40. Zinc pellets having diameters of 0.024 inches, 0.030 inches, or 0.040 inches can be used. However, other sizes, as well as other fuels, can also be used.

The conduits 54 are narrow and relatively long to substantially minimize electrical conductivity and parasitic current leakage between the battery cells 42 through the electrolyte 60. Similarly, the conduits 24 are also narrow and relatively long in order to substantially minimize electrical conductivity and parasitic current leakage between the fuel compartments 12 through the electrolyte 60. Parasitic current leakage can also be minimized by arranging the battery cells 42 and the fuel compartments 12 in series for the flow of electrolyte.

Filters 34 prevent the passage of fuel particles 62 into the conduits 54 and 24, which also minimizes electrical conductivity through the conduits 54 and 24. If a sufficient amount of fuel particles 62 were to build up in the conduits 54 and 24, this would cause an electrical short circuit through the fuel particles 62 between the battery cells 42 or the fuel compartments 12.

During operation of the refuelable battery 40, parasitic energy losses due to electrical leakage through the conductive electrolyte 60 in the conduits 54 and 24 is, preferably, substantially minimized. Total parasitic losses of less than five percent of the total power output of the refuelable battery 40 are preferred.

By reducing the minimum diameter of the conduits 54 and 24, and by increasing their length, the electrical resistance through the conduits can be increased substantially in order to reduce the parasitic losses. The electrical resistance of a conduit containing electrolyte is:

$$R = \frac{L}{AC}$$

Where R is the resistance through the conduit, L is the length of the conduit, A is the cross sectional area of the conduit, and C is the conductivity of the electrolyte. For example, in a 1000 Watt prototype system having twelve battery cells and fuel compartments, both arranged in parallel, two parallel conduits connecting each of the fuel compartments to the electrolyte reservoir will result in parasitic losses of 4.5 Watts or 0.45 percent of the total 1000 Watt power output of the refuelable battery when the conduits have a diameter of 2 mm and a length of 10 mm and the conductivity of the electrolyte, potassium hydroxide, is 0.25 mho/cm.

In practice, the amount that parasitic losses can be reduced in this manner is limited, however, because fluid flow of the electrolyte 60 must still be maintained through the conduits 54 and 24, and the hydraulic resistance to fluid flow through the conduits 54 and 24 increases as the diameter decreases and the length increases. Thus, a variety of different combinations of conduit diameter, length and quantity are possible to achieve a balance between maintaining the flow of the electrolyte 60, while substantially minimizing electrical conductivity and the resulting parasitic losses through the conduits 54 and 24.

Multiple parallel conduits may be used in place of the single conduits 54 and 24 shown to provide a backup in the event there is a blockage of one conduit. Multiple parallel conduits tend to prevent hydraulic pressure from backing up behind a blockage and holding it in place.

Connecting to the top end 56 of the battery cells 42 are openings 50 which are configured to receive the ends 30 of the channels 18 of the transportable container 10. The refuelable battery 40 further comprises a channel 46 connecting the pump 44 to an opening 48 which is configured to receive the end 32 of the channel 20 of the transportable container 10.

As shown in FIG. 3, the transportable container 10 is coupled to the refuelable battery 40 by lowering it straight down so that the ends 30 of the channels 18 fit into the openings 50 and the end 32 of the channel 20 fits into the opening 48 and, preferably, deforms slightly so as to establish a sealed connection for the flow of electrolyte 60. Other types of seals are possible. The transportable container 10 may be attached to the refuelable battery 40 using any convenient method.

Once the transportable container 10 is connected to the refuelable battery 40, the sealing member 16 is moved to an open position so as to allow the fuel particles 62 and the electrolyte 60 to flow through the channels 18 and into the battery cells 42, thus refueling the refuelable battery 40. The sealing member 16 may be moved using any convenient mechanism (not shown), such as a lever and cam, a screw, or other mechanism.

During battery operation, the pump 44 circulates the electrolyte 60 through the refuelable battery 40 and the transportable container 10 by drawing the electrolyte 60 from the bottoms 52 of the battery cells 42 via the conduits 54 and 55 and pumping it through the channel 46 and into the transportable container 10 through the connection made by the opening 48 and the channel 20. The electrolyte flows through the tube 22 and into the electrolyte reservoir 14, and from there, through the conduits 24 and 25 and into the fuel compartments 12, where the electrolyte 60 passes through down into the battery cells 42 through the connection made by the channels 18 and the openings 50. The fuel particles 62 are free to feed downward from the fuel compartments 12 into the battery cells 42, where the fuel particles 62 dissolve over the course of battery discharge. Thus, it can be seen that the transportable container 10 and the refuelable battery 40 define a closed flow circuit for the circulation of electrolyte 60 during battery operation.

When the electrolyte 60 becomes sufficiently loaded with reaction products to render it incapable of supporting continued battery discharge, or the level of fuel particles 62 has fallen sufficiently, the refuelable battery 40 is deactivated by shutting off the pump 44 and closing off the channels 18 and 20 by moving sealing member 16 to a closed position. The transportable container 10, now containing spent electrolyte and reaction products, can then be removed from the refuelable battery 40 and replaced with another transportable container 10 containing fresh electrolyte 60 and fuel particles 62.

The direction of electrolyte flow may be reversed in all embodiments. The direction shown has been found to promote reliable feeding of the fuel particles 62 from the fuel compartments 12 into the battery cells 42. It is also possible for an additional electrolyte storage electrolyte reservoir (not shown) to be inside the refuelable battery 40.

Figure 4:
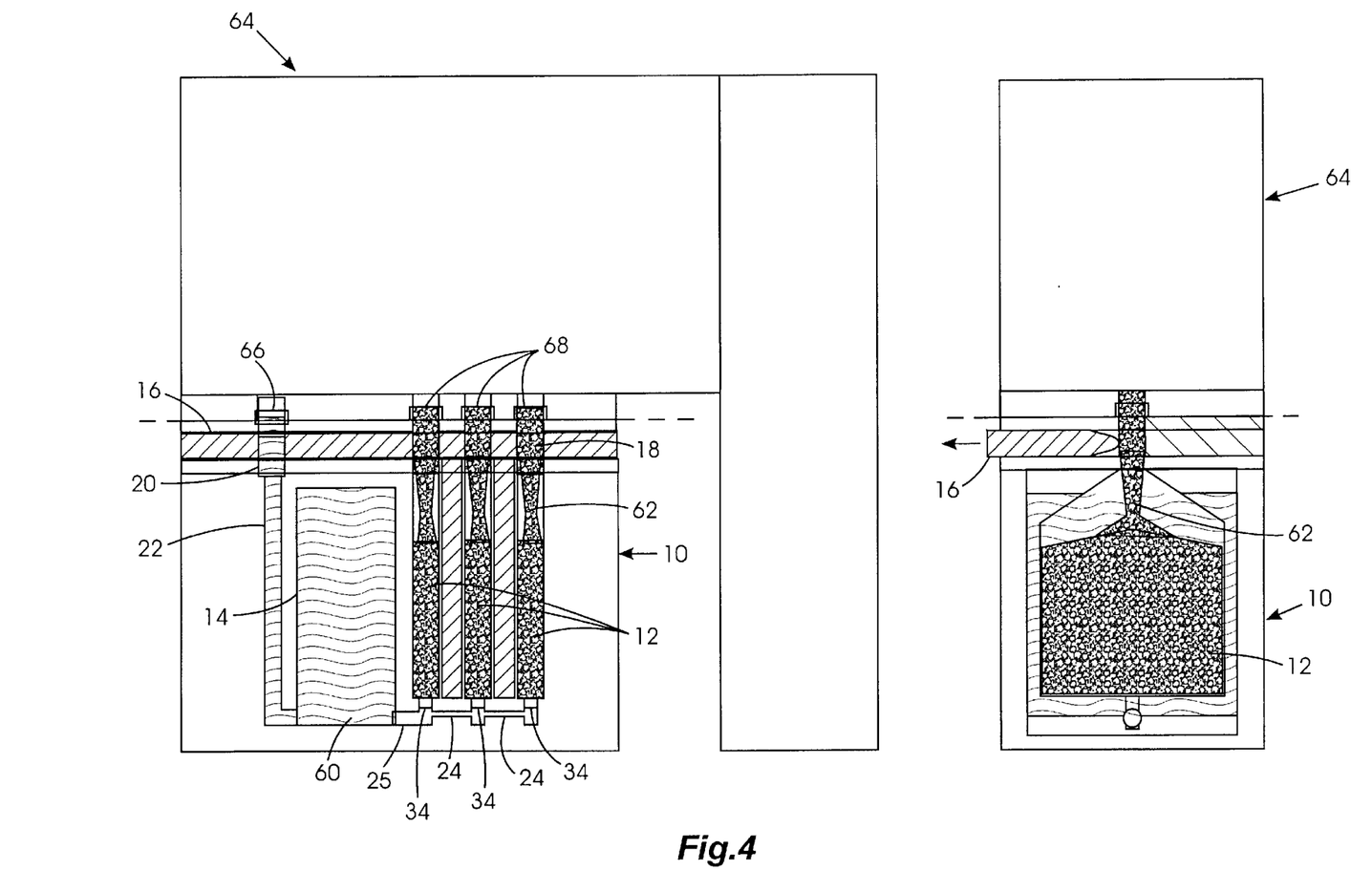
FIG. 4 is a schematic illustration of the first embodiment of the transportable container of FIGS. 2 and 3, attached to a transportable container refilling apparatus.

FIG. 4 is a schematic illustration of the transportable container 10 attached to a refilling apparatus 64. As shown in FIG. 4, in the refilling procedure, the transportable container 10 is attached, in an upside down orientation, to the refilling apparatus 64.

The transportable container 10 is coupled to the refilling apparatus 64 so that the ends 30 of the channels 18 fit into corresponding openings 68 on the refilling apparatus 64 and the end 32 of the channel 20 fits into opening 66 on the refilling apparatus 64 so as to establish a sealed connection for the flow of electrolyte 60, similar to the connection of the transportable container 10 to the refuelable battery 40. The transportable container 10 may be attached to the refilling apparatus 64 using any convenient method.

The sealing member 16 is then moved from the closed position to the open position so as to open the channels 18 and 20. Spent electrolyte is then withdrawn from the transportable container 10 via the tube 22, which is connected to the bottom (in the orientation shown in FIG. 4) of the electrolyte reservoir 14 of the transportable container 10. Fresh fuel particles 62, such as zinc pellets, are washed with electrolyte 60 into the fuel compartments 12 from the refilling apparatus 64 through the channels 18. This process is continued until sufficient fuel particles 62 are washed into fuel compartments 12 and the channels 18 are largely clear of fuel particles 62. If necessary, additional electrolyte 60 is added through the channel 20 and tube 22 until the electrolyte reservoir 14 is filled with electrolyte 60.

The sealing member 16 is then moved to the closed position so as to seal off the channels 18 and 20 to prevent the further passage of the fuel particles 62 and electrolyte 60. The transportable container 10 is then removed from the refilling apparatus 64. This completes the procedure for refilling the transportable container 10.

FIG. 5 illustrates a second embodiment of a transportable container 70 where similar reference numbers denote similar elements to the first embodiment depicted in FIGS. 2 through 4. The transportable container 70 has an alternative valve system for sealing off fuel compartments 12 and electrolyte reservoir 14 as well as an alternative way of coupling to a refuelable battery 90. As in FIGS. 2 through 4, the transportable container 70 and refuelable battery 90 are shown in FIG. 5, for illustration purposes only, in a three cell configuration.

Figure 5A:
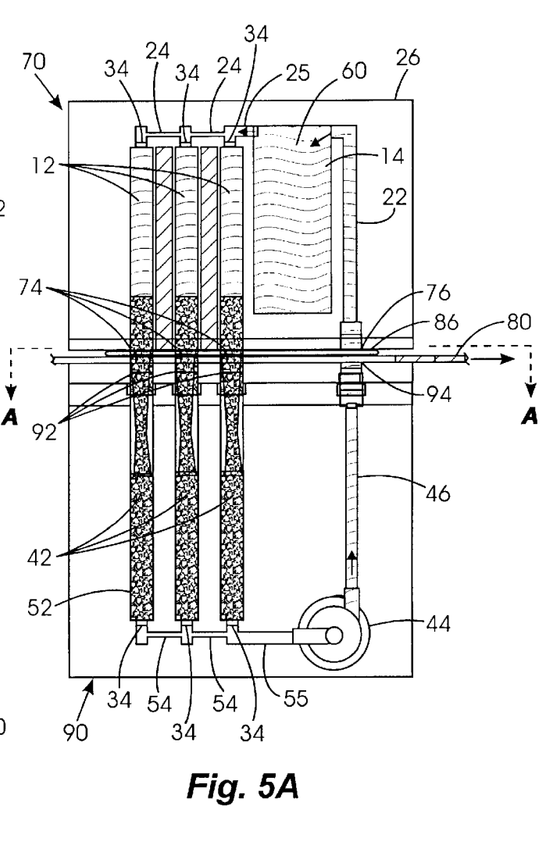
FIG. 5A is a schematic illustration of a second embodiment of a transportable container attached to a refuelable battery.
Figure 5B:
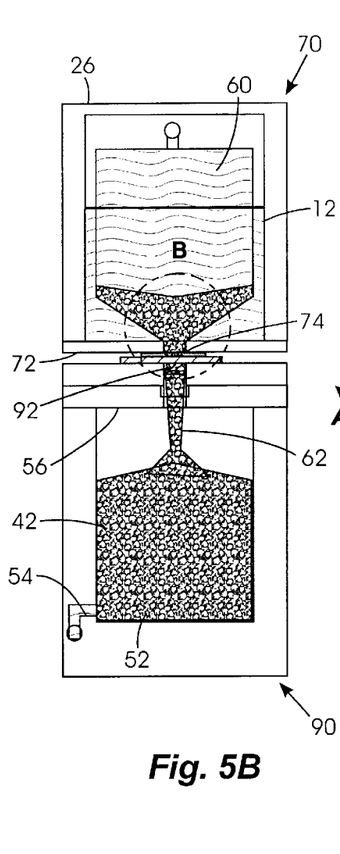
FIG. 5B is a schematic illustration of a side view of the transportable container attached to the refuelable battery shown in FIG. 5A.

Transportable container 70 comprises a plurality of passage ports 74 located on an interface surface 72 of the transportable container 70, which pass through the case 26 and which are connected to the fuel compartments 12. The ports 74 correspond in position to openings 92 on the refuelable battery 90 which connect to the tops 56 of the battery cells 42. The transportable container also has a port 76 located on the interface surface 72, which also passes through the case 26, and which is connected to the electrolyte reservoir 14 via the tube 22. The port 76 corresponds in position to an opening 94 on the refuelable battery 90 which connects to the channel 46.

The transportable container 70 further comprises a thin band 80 having a narrow portion 82 and a wide portion 84 which is movably attached to the case 26 of the transportable container 70. The thin band 80 may be made of stainless steel or any other sufficiently strong material able to withstand the caustic electrolyte. In a closed position, shown in FIG. 5E, the wide portion 84 covers the ports 74 and 76 to prevent the flow of the electrolyte 60 and fuel particles 62. In an open position, shown in FIG. 5C, the narrow portion 82 is moved over the ports 74 and 76 to permit the flow of the electrolyte 60 and fuel particles 62.

Figure 6:
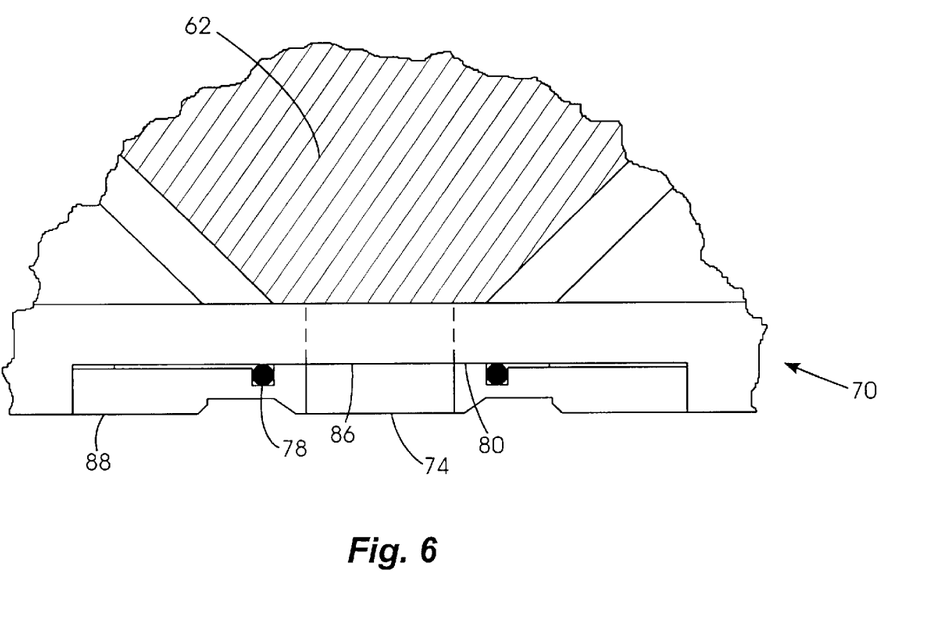
FIG. 6 is an enlarged view taken at section B in FIG. 5B.

A narrow gap 86 of up to approximately 0.003" is generally allowed between the thin band 80 and the interface surface 72 to eliminate friction between the thin band 80 and the interface surface 72. The gap 86 allows a small amount of liquid electrolyte 60 to leak between the fuel compartments 12. This allows parasitic electrical leakage currents between battery cells 42 when the refuelable battery 90 is operating, but these leakage currents dissipate only a small fraction of the power output of the refuelable battery 90, provided that the gap 86 is sufficiently narrow. The electrolyte 60 is prevented from leaking from the transportable container 70 through the gap 86 by an O-ring seal 78 located between the thin band 80 and the interface surface 72, and which is positioned around the ports 74 and 76. The thin band 80 and the O-ring seal 78 can be held in place on the transportable container 70 by a gasket member 88 as seen in FIG. 6. The gasket member 88 also allows the gap 86 to be maintained at a controlled thickness.

The thin band 80 may be of fixed length and attached to take up reels (not shown) with handles or other means (not shown) for rotating the take up reels so as to move the thin band 80 between the open and closed positions. Alternatively, the thin band 80 may be a continuous loop, in which case it may pass around the transportable container 70, and have a linear pull mechanism (not shown) or other means for moving the thin band 80 between the open and closed positions.

Prior to attachment of the transportable container 70 to the refuelable battery 90, the thin band 80 is in the closed position, such that the ports 74 and 76 are sealed. After attachment of the transportable container 70 to the refuelable battery 90, the thin band 80 is moved to the open position, so as to allow passage of fuel particles 62 and electrolyte 60 through the ports 74 and 76.

During the operation of the refuelable battery 90, the pump 44 pumps the electrolyte 60 from the bottoms 52 of battery cells 42, through the channel 46 and into the transportable container through the connection made by the opening 94 and the port 76, through the tube 22, and into the electrolyte reservoir 14, and from there, through the conduits 24 and 25 and into the fuel compartments 12, where the electrolyte 60 passes down through the connection made by ports 74 and openings 92 and into the top end 56 of the battery cells 42.

Figure 5C:
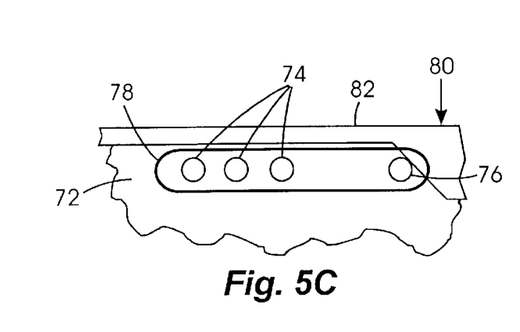
FIG. 5C is a section view taken along line A—A in FIG. 5A, showing a thin band in an open position.
Figure 5D:
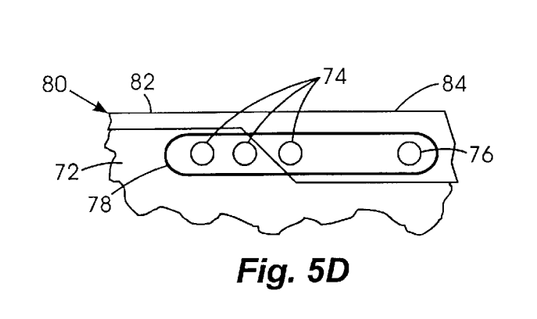
FIG. 5D is a section view taken along line A—A in FIG. 5A, showing the thin band of FIG. 5C in a partially closed position.
Figure 5E:
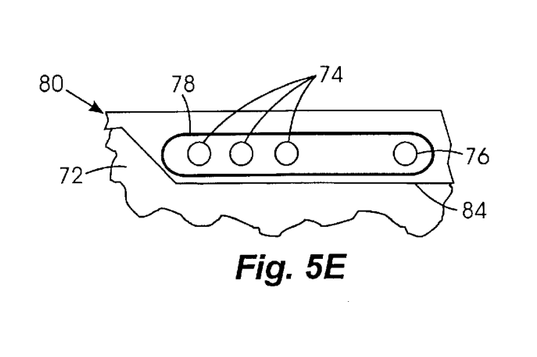
FIG. 5E is a section view taken along line A—A in FIG. 5A, showing the thin band of FIG. 5C in a fully closed position.

When the thin band 80 is in the open position, shown in FIG. 5C during operation of the refuelable battery 90, only a narrow portion 82 of the thin band 80 spans the interface surface 72 of the transportable container 70 where the ports 74 are located. This narrow portion 82 is located outside the O-ring seal 78 so that the thin band 80 does not short circuit the battery cells 42.

When the electrolyte 60 becomes sufficiently loaded with reaction products to render it incapable of supporting continued battery discharge, or the level of fuel particles 62 has fallen sufficiently below the container/battery interface, the refuelable battery 90 is deactivated by shutting off the pump 44, and closing off the ports 74 and 76 by moving the thin band 80 from the open position to the closed position. The transportable container 70, now containing spent electrolyte and reaction products, can then be uncoupled and removed from the refuelable battery 90 and replaced with another transportable container 70 containing fresh fuel particles 62 and fresh electrolyte 60.

Figure 7A:
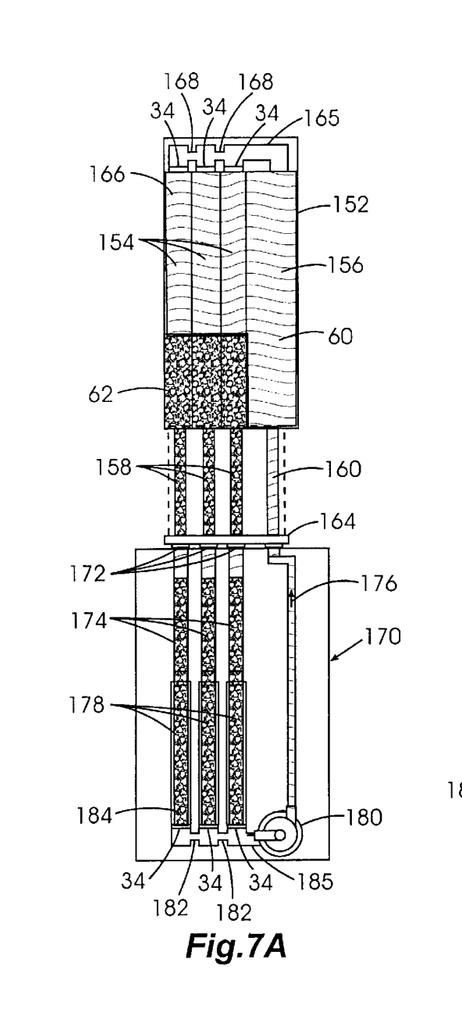
FIG. 7A is a schematic illustration of a third embodiment of a transportable container attached to a refuelable battery.
Figures 7B, 7C:
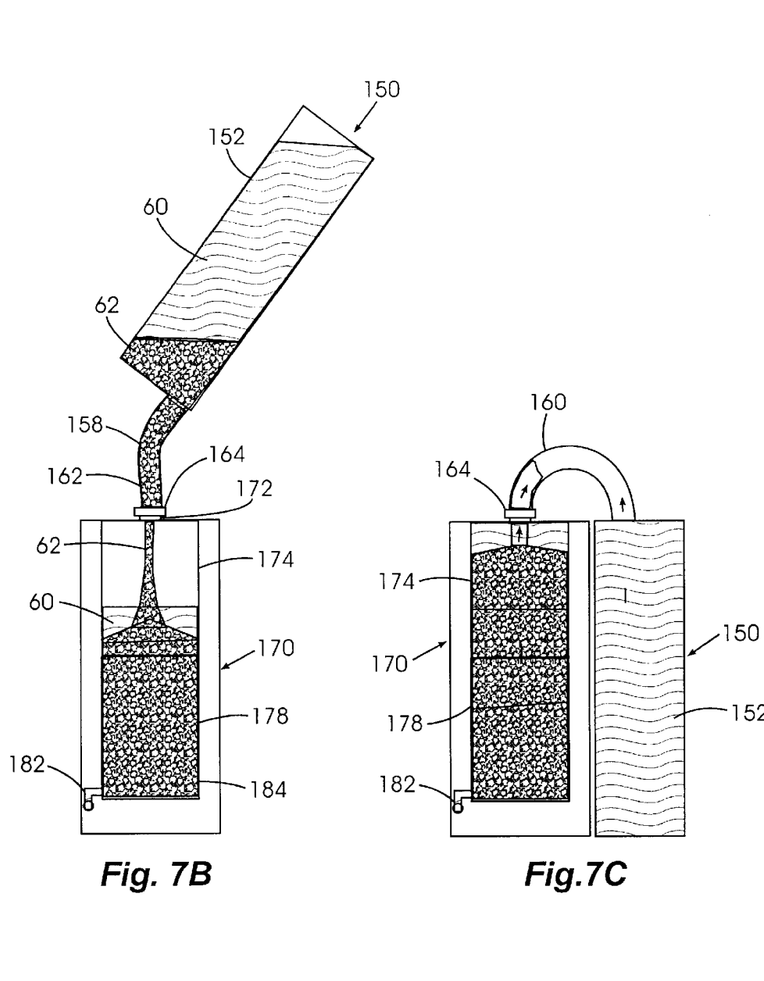
FIG. 7B is a schematic illustration of a side view of the transportable container attached to the refuelable battery shown in FIG. 7A.
FIG. 7C is a schematic illustration of a side view of the transportable container attached to the refuelable battery shown in FIG. 7A.

FIG. 7 shows a third embodiment of a transportable container 150 and a refuelable battery 170. The transportable container 150 and the refuelable battery 170 are shown, for illustration purposes only, in a three cell configuration.

The transportable container 150 comprises a canister 152 having fuel compartments 154 and an electrolyte reservoir 156 for holding and dispensing, respectively, a measured amount of fuel particles 62 and electrolyte 60. Attached to the canister 152 are flexible channels 158 and 160 which are connected to the fuel compartments 154 and to the electrolyte reservoir 156, respectively. The flexible channels 158 and 160 are permanently attached to the canister 152 and are held together at an opposite end 162 by an elongated end piece 164 or by other convenient means. At a bottom end 166 of the fuel compartments 154, there are narrow and relatively long conduits 168 connecting the fuel compartments 154 to each other. The fuel compartments 154 are also connected to the electrolyte reservoir 156 via a wider conduit 165.

A filter 34 is placed in each of the conduits 168, or in the fuel compartments 154 adjacent to the conduits 168, to prevent the passage of fuel particles 62 through the conduits 168 between the fuel compartments 154. If fuel particles 62 enter the conduits 168, a blockage of the conduits 168 or an electrical short circuit can result.

The refuelable battery 170 has a set of openings 172 which are configured to receive the end piece 164 to form a sealed connection between the transportable container 150 and the refuelable battery 170. Once connected, the transportable container 150 and the refuelable battery 170 define a closed flow circuit for the circulation of electrolyte 60 during battery operation. The set of openings 172 are connected to hoppers 174 inside the refuelable battery 170 and to a channel 176. The hoppers 174 are configured to contain a volume of fuel particles 62 in electrolyte 60. Located below each of the hoppers 174 is a battery cell 178. The battery cells 178 are connected to each other via narrow and relatively long conduits 182 connected to a bottom end 184 of each battery cell 178. The battery cells 178 are also connected to a pump 180 via a wider conduit 185. Connected to the pump 180 is the channel 176 which is connected back to the set of openings 172.

A filter 34 is placed in each of the conduits 182, or in the battery cells 178 adjacent to the conduits 182, to prevent the passage of fuel particles 62 through the conduits 182 between the battery cells 178.

It is possible that the conduits 182 and 168 may be made sufficiently narrow to prevent the passage of fuel particles 62 even without the filter 34, while permitting the passage of electrolyte 60. Conduits 182 and 168 are configured to substantially minimize parasitic losses similar to conduits 54 and 24.

The internal volume of the canister 152 is relatively larger than the available volume in the refuelable battery 170 when the battery cells 178 are filled with dry fuel particles 62.

The refuelable battery 170 is fueled by connecting the end piece 164 of the transportable container 150 to the set of openings 172 on the refuelable battery 170, whose battery cells 178 have been filled with dry fuel particles 62. The canister 152 is then elevated as to drain the fuel particles 62 contained in the canister 152, but not a significant portion of the electrolyte 60, into the hoppers 174 above the battery cells 178. After the fuel particles 62 have been completely emptied into the hoppers 174, the transportable container 150 is lowered into the position shown in FIG. 7C and secured to the refuelable battery 170.

During battery operation, the pump 180 pumps the electrolyte 60 via the conduits 182 and 185 from the battery cells 178 up through the channel 176 and the flexible channel 160 into electrolyte reservoir 156 of the canister 152. The electrolyte 60 then flows into the fuel compartments 154 via the conduits 168 and 165 and then into the hoppers 174 through the flexible channels 158. The electrolyte 60 then flows back into the battery cells 178 from the hoppers 174. The fuel particles 62 are free to feed downward from the hoppers 174 into the battery cells 178, where the fuel particles 62 dissolve over the course of battery discharge.

When the electrolyte 60 becomes sufficiently loaded with reaction product to render it incapable of supporting continued battery discharge, or the level of fuel particles 62 has fallen sufficiently, the refuelable battery 170 is deactivated by shutting off the pump 180. The transportable container 150, now containing spent electrolyte and reaction products, can then be disconnected from the refuelable battery 170 and replaced with another container 150 containing fresh fuel particles 62 and fresh electrolyte 60.

Thus, a method and apparatus for feeding multiple electrochemical cells employing particulate electrodes are described. It will be appreciated by persons skilled in the art that the invention is not limited by what has been particularly shown and described above. The above description of preferred and alternative applications and embodiments is for purposes of illustration and is not intended to be exhaustive or to limit the invention to the precise form disclosed. Many more modifications and variations are possible without departing from the inventive concepts herein. The invention, therefore, is not to be restricted except in the spirit of the appended claims.

We claim:

1. A transportable container for refueling a refuelable battery having an electrochemical cell employing a particulate electrode, comprising:
   (a) a case;
   (b) an electrolyte reservoir, within the case, capable of holding a volume of electrolyte solution;
   (c) a first valve, in fluid connection with the electrolyte reservoir, which passes through the case and is capable of connecting to a refuelable battery;
   (d) a fuel compartment, within the case, capable of holding electrochemically active fuel particles and electrolyte solution;
   (e) a second valve, in fluid connection with the fuel compartment, which passes through the case and is capable of connecting to a refuelable battery; and
   (f) a conduit, in fluid connection with the electrolyte reservoir and the fuel compartment, such that the transportable container and a refuelable battery define a closed flow circuit for the circulation of electrolyte solution through the transportable container and the refuelable battery while the transportable container is connected to a refuelable battery during operation of the refuelable battery.

2. The transportable container of claim 1, further comprising a filter capable of preventing the passage of fuel particles between the fuel compartment and the electrolyte reservoir.

3. The transportable container of claim 1, the conduit being sufficiently narrow to prevent the passage of fuel particles, yet capable of allowing passage of electrolyte solution.

4. The transportable container of claim 1, the first valve and the second valve being comprised of flexible channels, the transportable container further comprising a sealing member, movably attached to the transportable container, which is capable of pinching closed the flexible channels.

5. The transportable container of claim 1, further comprising a cover capable of sealing the first valve and the second valve when the transportable container is not connected to a refuelable battery.

6. The transportable container of claim 5, the cover being attached to the case.

7. The transportable container of claim 1, the case being liquid sealed.

8. A transportable container for refueling a refuelable battery having an electrochemical cell employing a particulate electrode, comprising:
 (a) a case;
 (b) an electrolyte reservoir, within the case, capable of holding a volume of electrolyte solution;
 (c) a first valve, comprised of a first flexible channel, in fluid connection with the electrolyte reservoir, which passes through the case and is capable of connecting to a refuelable battery;
 (d) a fuel compartment, within the case, capable of holding electrochemically active fuel particles and electrolyte solution;
 (e) a second valve, comprised of a second flexible channel, in fluid connection with the fuel compartment, which passes through the case and is capable of connecting to a refuelable battery;
 (f) a conduit, in fluid connection with the electrolyte reservoir and the fuel compartment, such that the transportable container and a refuelable battery define a closed flow circuit for the circulation of electrolyte solution through the transportable container and the refuelable battery while the transportable container is connected to a refuelable battery during operation of the refuelable battery;
 (g) a sealing member, movably attached to the transportable container and capable of pinching closed the first and second flexible channels; and
 (h) a cover capable of sealing the first valve and the second valve when the transportable container is not connected to a refuelable battery.

9. The transportable container of claim 8, further comprising a filter capable of preventing the passage of fuel particles between the fuel compartment and the electrolyte reservoir.

10. The transportable container of claim 8, the conduit being sufficiently narrow to prevent the passage of fuel particles, yet capable of allowing passage of electrolyte solution.

11. A transportable container for refueling a refuelable battery having multiple electrochemical cells employing particulate electrodes, comprising:
 (a) a case;
 (b) one or more fuel compartments, within the case, capable of holding electrochemically active fuel particles and electrolyte solution;
 (c) a plurality of valves, in fluid connection with the one or more fuel compartments, which pass through the case and are capable of connecting to a refuelable battery; and
 (d) one or more conduits connecting the one or more fuel compartments to each other, such that the transportable container and a refuelable battery define a closed flow circuit for the circulation of electrolyte solution through the transportable container and the refuelable battery while the transportable container is connected to a refuelable battery during operation of the refuelable battery.

12. The transportable container of claim 11, further comprising an electrolyte reservoir, within the case and connected to the one or more fuel compartments, and a second valve, in fluid connection with the electrolyte reservoir and which passes through the case and is capable of connecting to a refuelable battery.

13. The transportable container of claim 11, the one or more conduits being capable of substantially minimizing electrical conductivity between each of the one or more fuel compartments through the conduits when the transportable container contains electrolyte solution.

14. The transportable container of claim 13, the one or more conduits being sufficiently narrow and relatively long to substantially minimize electrical conductivity between each of the one or more fuel compartments through the conduits when the transportable container contains electrolyte solution.

15. The transportable container of claim 11, further comprising one or more filters capable of preventing the passage of fuel particles between each of the one or more fuel compartments.

16. The transportable container of claim 11, the one or more conduits being sufficiently narrow to prevent the passage of fuel particles, yet capable of allowing passage of electrolyte solution.

17. The transportable container of claim 12, the plurality of valves and the second valve comprising flexible channels, the transportable container further comprising a sealing member, movably attached to the transportable container, which is capable of pinching closed the flexible channels.

18. The transportable container of claim 12, the plurality of valves and the second valve comprising openings through the case of the transportable container, and a thin band, movably attached to the transportable container, which is capable of moving between an open and closed position to unseal and seal, respectively, the openings through the case.

19. The transportable container of claim 11, further comprising a cover capable of sealing the plurality of valves when the transportable container is not connected to a refuelable battery.

20. The transportable container of claim 19, the cover being attached to the case of the transportable container.

21. The transportable container of claim 11, the case being liquid sealed.

22. The transportable container of claim 11, the one or more fuel compartments being connected in parallel for the flow of electrolyte solution.

23. A refuelable electrochemical power source comprising:
 (a) a refuelable battery having one or more electrochemical cells which employ particulate electrodes, and one or more conduits connecting the one or more electrochemical cells to each other; and
 (b) a transportable container, removably attached to the refuelable battery, having:
  a case;
  a compartment within the case capable of holding a volume of electrolyte solution, and
  a first valve and a second valve in fluid connection with the compartment and which pass through the case and are removably connected to the refuelable battery, such that the transportable container and the refuelable battery define a closed flow circuit for the circulation of electrolyte solution through the transportable container and the electrochemical cells of the refuelable battery while the transportable container is connected to the refuelable battery during operation of the refuelable battery.

24. A refuelable electrochemical power source comprising:
(a) a refuelable battery having one or more electrochemical cells which employ particulate electrodes, and one or more first conduits connecting the one or more electrochemical cells to each other; and
(b) a transportable container, removably attached to the refuelable battery, having:
a case,
one or more fuel compartments within the case, capable of holding a volume of electrochemically active fuel particles and electrolyte solution,
a plurality of valves in fluid connection with the one or more fuel compartments and which pass through the case and are removably connected to the refuelable battery, and
one or more second conduits, connecting the one or more fuel compartments to each other, such that the transportable container and the refuelable battery define a closed flow circuit for the circulation of electrolyte solution through the transportable container and the electrochemical cells of the refuelable battery while the transportable container is connected to the refuelable battery during operation of the refuelable battery.

25. The refuelable electrochemical power source of claim 24, the one or more electrochemical cells being connected in parallel for the flow of electrolyte solution.

26. The refuelable electrochemical power source of claim 25, the one or more first conduits being capable of substantially minimizing electrical conductivity through the electrolyte solution between each of the one or more electrochemical cells, and the one or more second conduits being capable of substantially minimizing electrical conductivity through the electrolyte solution between each of the one or more fuel compartments.

27. The refuelable electrochemical power source of claim 26, the one or more first conduits being sufficiently narrow and relatively long to substantially minimize electrical conductivity through the electrolyte between each of the one or more electrochemical cells, and the one or more second conduits being sufficiently narrow and relatively long to substantially minimize electrical conductivity through the electrolyte between each of the one or more fuel compartments.

28. The refuelable electrochemical power source of claim 24, the one or more electrochemical cells being connected in series for the flow of electrolyte solution.

29. The refuelable electrochemical power source of claim 24, the transportable container further having an electrolyte reservoir, within the case and connected to the one or more fuel compartments, and a second valve, in fluid connection with the electrolyte reservoir and which passes through the case and is removably connected to the refuelable battery.

30. The refuelable electrochemical power source of claim 24, the transportable container being capable of feeding fuel particles and electrolyte solution directly into each of the one or more electrochemical cells of the refuelable battery.

31. The refuelable electrochemical power source of claim 24, the refuelable battery further having one or more hoppers capable of containing a volume of fuel particles and electrolyte solution, and connected to the one or more electrochemical cells, the transportable container being capable of feeding fuel particles into the one or more hoppers.

32. The refuelable electrochemical power source of claim 31, the refuelable battery further having an electrolyte reservoir, capable of containing a volume of electrolyte solution, which is connected to the one or more hoppers.

33. The refuelable electrochemical power source of claim 24, the refuelable battery further having an electrolyte reservoir, capable of containing a volume of electrolyte solution, which is connected to the one or more electrochemical cells.

34. A method of operating a refuelable electrochemical power source, comprising the steps of:
(a) attaching a transportable container containing fuel particles and electrolyte to a refuelable battery, and allowing the fuel particles and electrolyte to dispense into the refuelable battery;
(b) circulating electrolyte solution through the refuelable battery and the attached transportable container for a period of time and thereby discharging the refuelable battery and dissolving some of the fuel particles into reaction products in spent electrolyte;
(c) detaching the transportable container with the reaction products and spent electrolyte from the refuelable battery; and
(d) attaching a transportable container containing fresh fuel particles and electrolyte to the refuelable battery.

35. The method of operating a refuelable electrochemical power source of claim 34, wherein after the transportable container with the reaction products and spent electrolyte is detached from the refuelable battery, the reaction products and spent electrolyte are removed and replaced with fresh fuel particles and electrolyte at a refilling apparatus.

36. The method of operating a refuelable electrochemical power source of claim 34, the fuel particles comprising zinc pellets.

37. The method of operating a refuelable electrochemical power source of claim 34, the fuel particles comprising aluminum pellets.

* * * * *